Patented July 25, 1950

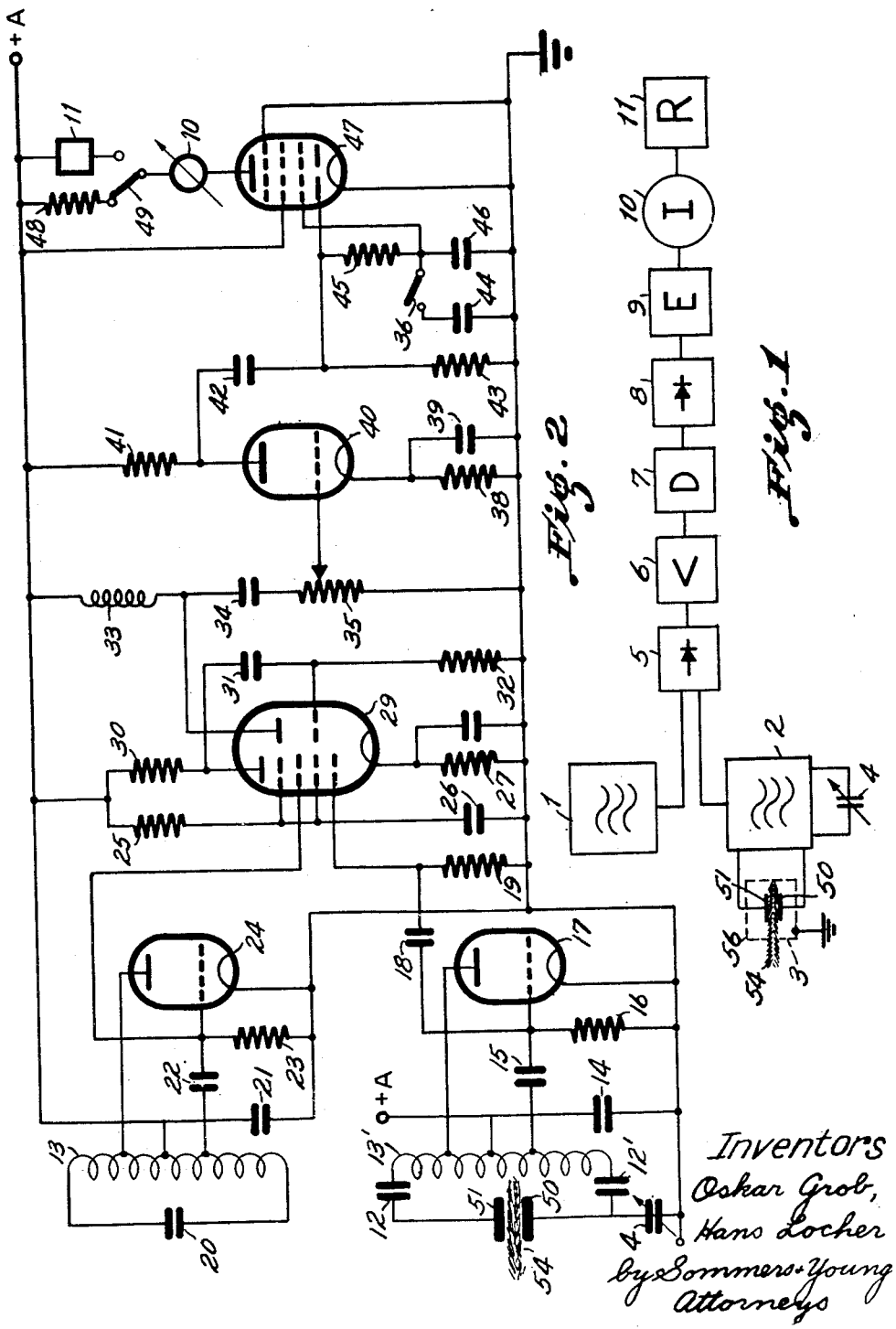

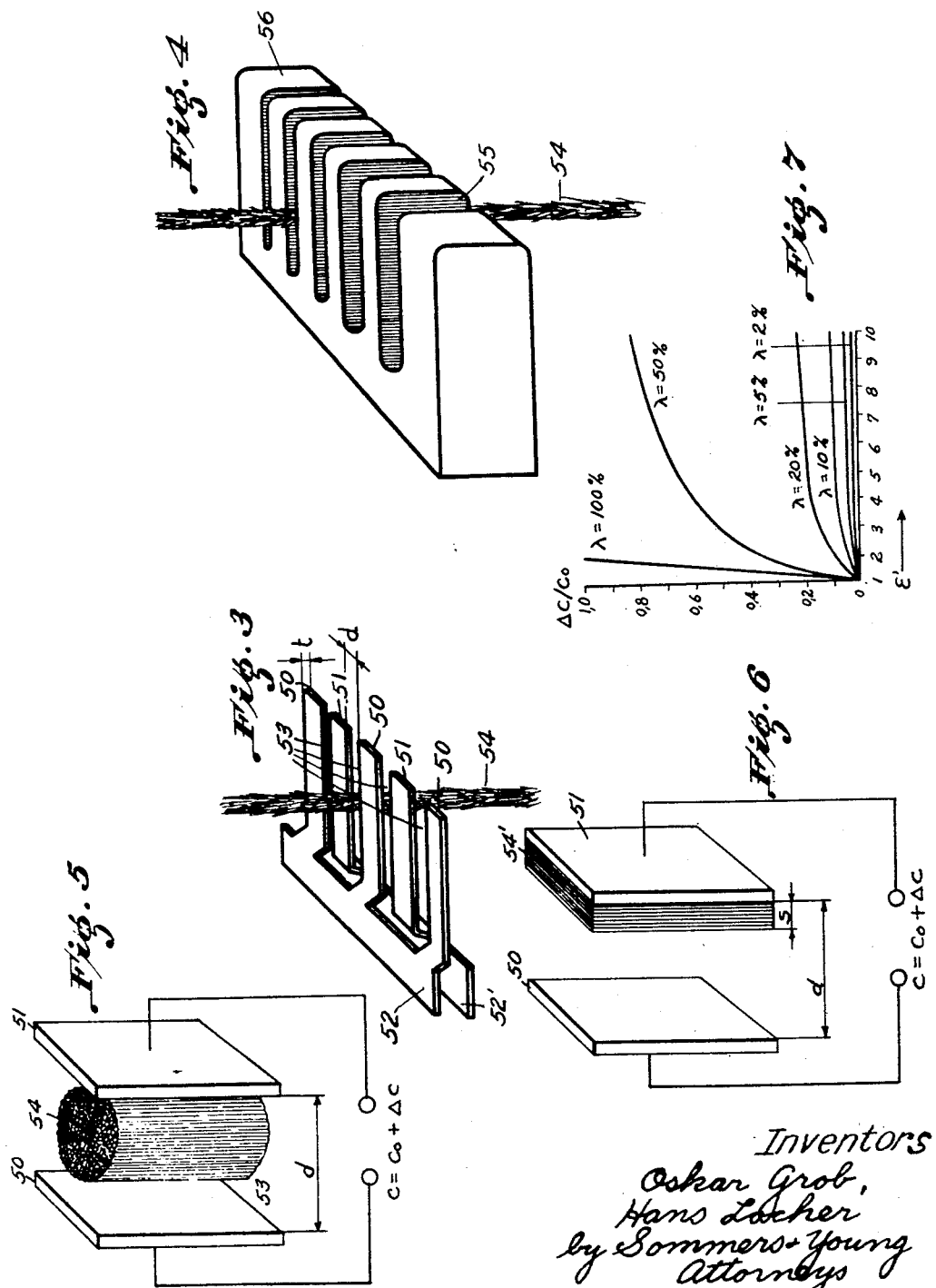

2,516,768

UNITED STATES PATENT OFFICE 2,516,768

REISSUED

APPARATUS FOR GAUGING TEXTILES, PARTICULARLY YARNS AND SLIVER

Oskar Grob and Hans Locher, Uster, Switzerland, assignors to Zellweger A. G. Apparate-und Maschinenfabriken Uster, Uster, Switzerland

MAY 22 1951

Application October 29, 1946, Serial No. 706,340
In Switzerland April 29, 1946

RE. 23368

2 Claims. (Cl. 175—183)

In the textile industry it is of particular importance to gauge the equality or uniformity of thickness of sliver, roving and yarns in all phases and stages of spinning, since such equality of the final yarn is of great influence on the strength thereof.

A great number of methods and devices for gauging the cross-sectional equality are known in the art, such as e. g. mechanically operating devices in which the test goods are pressed into some sort of measuring nozzle, and in which the cross-sectional variations are rendered visible to the naked eye by means of a mechanical scanning or "frisking" device and a lever gear.

Very high or fine yarn counts, however, cannot be gauged by mechanical means. The cross-sectional indications of the more or less loose and slack fibre structure are ambiguous and unreliable on account of the pressing action in the gauging nozzle. Most of the mechanical devices further show the disadvantage that the distance along which the test goods (sliver, roving, yarns, etc.) is measured, is of quite some length, thus rendering it impossible to ascertain irregularities which arise on a short stretch of the test goods only.

These drawbacks are obviated by the present invention. It deals with a measuring apparatus for determining the variations in cross section of textile materials, especially yarn, roving, and sliver, and comprises the combination of a first high frequency oscillator which produces a constant frequency, a second high frequency oscillator in the frequency determining oscillating circuit of which at least one measuring condenser is inserted having a plurality of measuring fields with varying electrode separation, the frequency produced by the second oscillator, so long as no test material is present in the measuring fields, corresponding exactly to the frequency of the first oscillator, an arrangement adapted to draw the textile material to be tested through the measuring fields with uniform speed, the capacity of the measuring condenser increasing in accordance with the cross section of the test material present in the measuring field, thus serving correspondingly to reduce the frequency produced by the second oscillator, so that a difference in frequency will be produced between the frequencies of the two oscillators which will be directly proportional to the substance cross section of the material under test and including means for directly producing this difference in frequency, means for converting said frequency difference into a potential amplitude directly proportional to the frequency difference and means for graphically recording this potential amplitude upon a recording strip travelling at constant speed.

The electrodes of the measuring condenser are preferably constituted in comb-shaped form and in such fashion that the comb-like teeth of one electrode lie between the chafered comb-like teeth of the other electrode and so that between each comb-like tooth of one electrode and the adjacent comb-like tooth of the other electrode a measuring field will be produced through which the material undergoing test can be drawn, the width of the thus constituted measuring fields being so chosen that the substance of the tested material occupies 2 to 20% of the measuring field then in use. Furthermore, it is preferable to shield the measuring fields of the measuring condenser from exterior mechanical and electrical disturbances by means of an electrostatic shield and to fill the hollow spaces between the electrodes and the shield with insulating material.

Our present invention eliminates the said disadvantages, and relates to the gauging of the cross-sectional equality of textiles, in particular yarn, roving and sliver, by means of an electric measuring condenser, the capacity value of which is varied by the cross-section of the test goods passed at a uniform speed through the condenser field. Our invention consists in varying the frequency of an electric oscillator by varying the capacity of the measuring condenser, and heterodyning such frequency by a constant frequency, using an electrical value obtained from such frequency difference, and capable of being directly measured, as a measure for the size of the cross-sectional area.

The frequency difference brought about by the test goods (giving a measure for the test goods cross-section) conveniently is converted into a potential amplitude varying directly therewith and being used for controlling an indicator.

Our present invention further relates to an apparatus for carrying out the method indicated above, and comprises an electric measuring condenser capable of being biased by the test goods, which in its turn so biases the frequency of an oscillator having an electric oscillating circle that a directly measurable electrical value, obtained from the difference of the said frequency relative to a constant frequency, represents a measure for the cross-sectional area of the test goods.

The measuring condenser suitably is adapted (in a geometrical sense) to permit of using one and the same measuring condenser for gauging test-goods cross-sectional areas different in mean value, in that such condenser comprises at least two spaced electric measuring fields suited for measurement and in which the unit of cross-sectional area gives origin to different variations in capacity.

I attain the above mentioned objects by the system set forth in the accompanying drawings, in which Fig. 1 shows a diagrammatic layout circuit of the arrangement of the invention.

Fig. 2 shows an example of the circuit control system of a device constructed in accordance with the invention.

Figs. 3 and 4 show the mechanical embodiment of important details of the invention.

Figs. 5, 6, and 7 serve for explaining the theory of the dielectric relationships in the measuring condenser.

The operation of the arrangement of the invention will be hereinafter explained in the light of Fig. 1. 1 designates an oscillator which produces an electrical oscillation of constant frequency. A second oscillator 2 produces a frequency which is influence by the capacity of the electrical measuring condenser 3. The textile material to be tested 54 is drawn at uniform speed through the measuring condenser field existing between the two condenser plates 50 and 51. This causes the capacity value of the measuring condenser 3 to change a small amount, corresponding to the substance cross section of the tested textile material 54.

A second and stationary oscillator 1, also arranged in three-point connection, is built up by the tube 24, the condenser 21 and the coil 13. In both oscillators 1 and 2, grid and anode are not applied to the full coil, but only to a tap. The tube capacities and their fluctuations thus act only in a restricted sense onto the oscillator frequencies. The feeding points of the oscillation circuits 51, 13', 12' and 20, 13 are by-passed by the condensers 21 and 14 respectively.

The oscillations set up by the two oscillators 1 and 2 are heterodyned in the tube 29, thus producing at frequency-equality a no-cycle heterodyne frequency. In the wiring layout, the control grids of the oscillator tubes 17 and 24 are applied, in a manner known, to the control grids of the hexode portion of tube 29.

Before a measurement is carried out, the preparatory step involves exact tuning of the frequency of oscillator 2 to the frequency of oscillator 1 with the aid of the variable equalizing condenser 4, before positioning the test material 54 in the measuring condenser 3. The oscillations produced by the two oscillators 1 and 2 are heterodyned in the mixer stage 5 and when the frequencies are balanced a beat frequency of zero cycles is produced. When the oscillator 2 is compensated for the frequency of oscillator 1, the test material 54 is placed in the electrical field of the measuring condenser 3.

The dielectric, prior to insertion of the test material 54, is therefore constituted solely of air, which has a dielectric constant of about 1. Bringing the test material 54 into the measuring field serves to increase the average dielectric constant of the dielectric, since the dielectric constant of the test material is appreciably greater than 1. The result is that the capacity value of the measuring condenser 3 is increased a definite amount. This increase in capacity is the greater the more the air is forced out by the test material, that is, the increase in capacity is a measure of the substance cross section of the test material 54.

It will be hereinafter explained under what conditions the capacity increase due to the substance cross section of the test material is a practically linear one and what requirements are imposed on the construction of the measuring condenser 3 so as to actually obtain the desired linearity.

The increase in the capacity value of the measuring condenser 3 changes the natural frequency of the oscillation circuit (2, 3) associated with it, and in turn alters the oscillation frequency of oscillator 2. Due to the change in the frequency of the oscillator 2 with respect to the frequency of the oscillator 1, a corresponding beat frequency will be produced in the mixer stage 5 (tube 9). Since the increase in capacity of the measuring condenser 3 corresponds to the substance cross section of the test material 54, the oscillation frequency of oscillator 2 will also change in a manner corresponding to the substance cross section of the test material 54. The amount of the frequency difference will, therefore, be a direct measure of the magnitude of the substance cross section of the test material 54.

The frequency difference thus obtained may, if necessary, be amplified in an amplifying stage 6. In the discriminator 7, which is constituted along lines well known in high frequency work, the frequency difference is converted into a potential amplitude which varies linearly with the frequency difference. If the discriminator 7 converts the frequency difference, representing a measure for the substance cross section of the test material 54, into a potential amplitude that is linearly dependent on the frequency, the amplitude of the potential leaving the discriminator 7 will in turn represent the magnitude of the substance cross section of the test material 54.

The frequency difference therefor after leaving the discriminator 7, is an alternating potential, the amplitude of which varies in accordance with the differential frequency. Such alternating potential can be rectified in a rectifier 8 and utilized for operating a final tube 9 and an indicating instrument 10.

Indication of the substance cross section may be in the form of an absolute value or in a value relative to the average value. To obtain an absolute indication (for example in the case of yarn defined in English or metric unit), the measurement values must also be corrected according to the moisture content and the nature of the material (staple fiber, cotton, etc.) inasmuch as the variation in the capacity of the measuring condenser 3 is influenced by these factors.

Other methods, however, are also known for accurately determining the average yarn unit values.

It is, therefore, preferable to indicate the substance cross section relatively with respect to its average value. This cross section average value may, for example, be marked as 100% on the scale and the entire scale then calibrated in percentages. The entire measurement range may amount to 200%, 300%, etc., depending on requirements in practice. Before a measurement is carried out, the cross section average value of the tested material must be ascertained and the deflection marked as 100% on the instrument. By increasing the rectification time constant of the rectifier 8 it is possible to prevent the indications at the instrument from partaking of the rapid fluctuations of the cross section of the test material as it passes through the device so that the indications will rather denote the average value of the cross section. The deflection of the indicating instrument, when the latter is adjusted for the average value of the cross section, is determined by the substance cross section of the test material and the variation in capacity per unit of substance cross section of the test material under consideration in the condenser measurement field utilized. By changing a constant of the apparatus, for example, the amplification in the amplifier 6, the measurement value indications can be set to the desired 100%. When this is effected, the time constant of the rectifier 8 can again be reduced to such an extent as to permit the indications to follow the fluctuations in the cross section of the test material.

A recording ampere meter 11 may be used for recording the percentual substance cross section as a function of the length of the test material. In that case the speed of the recording paper is adjusted so as to have a definite relation to the speed with which the test material passes through the measuring condenser field, which facilitates evaluating the diagrammatic record obtained.

A circuit adapted for the device of the invention is shown in Fig. 2 and is described in detail herewith.

The oscillator 1 for producing a constant frequency is constituted as follows:

An electronic tube 24 is used as the oscillation generator. The frequency of the high frequency voltage produced is determined by the oscillation circuit. This consists of the condenser 20 and the coil 13 which is constituted as an oscillation circuit inductance. In order to produce oscillations, a tap on coil 13 is used, according to the well-known Hartley circuit, to feed a definite portion of the high frequency voltage preduced at the anode of the oscillator tube back to the control grid. In order to have the tube capacities and their fluctuations act only partly on the oscillator frequency, the grid and anode of the oscillator tube are not connected with the entire coil 13 but only to taps thereof. As is well known, a negative biasing potential is produced at the grid of the oscillator tube by the grid condenser 22 as well as by the grid-leak resistance 23, and this biasing potential serves to define the amplitude of the high frequency voltage. The condenser 21 serves to bring the point to which the plate voltage +A is applied to the oscillator to a high frequency potential of 0. The high frequency voltage produced by the oscillator 1 and which is of constant frequency, is applied to the third grid of the mixer tube 29.

The oscillator 2, which is used for producing a frequency that is influenced by the measuring condenser 3, is constituted as follows:

The electronic tube 17 is used as the oscillation generator. The frequency of the oscillation produced is determined by the oscillation circuit which consists of the coil 13', the measuring condenser 3, the two blocking condensers 12 and 12', and the equalizing condenser 4. The two blocking condensers have a fixed capacity value and serve to block the anode (plate) voltage +A from reaching the measuring condenser 3. The oscillation frequency of the second oscillator can be changed within a certain range by means of the equalizing condenser 4.

Preferably a high frequency voltage that is symmetrical with respect to the ground is applied to the measuring condenser 3. This is achieved by connecting the high frequency grounded tap of coil 13' used for supplying the plate voltage, to the electrical center of the winding of coil 13'. The oscillator 2 utilizes the same circuit principle as that of Hartley and as is the case with oscillator 1. The taps of coils 13' to which the anode and grid of the oscillator tube 17 are attached, are constituted the same as in the case of oscillator 1. The condenser 14, the grid condenser 15, as well as the grid-leak resistance 16 have the same functions as the corresponding circuit elements of oscillator 1.

The coupling condenser 18, together with the series connected grid resistance 19 constitutes a voltage divider by means of which only a portion of the oscillator voltage is allowed to reach the first grid of the mixer tube 29.

The electronic tube 29, for example, is a combined mixer and amplifier tube. The two oscillator voltages are applied to the control grids of the mixer system. An alternating voltage is produced at the anode resistance 30, the frequency of which is equal to the difference of the two oscillations of the oscillators 1 and 2. The screen grid voltage is applied to the screen grid of the mixer tube through the resistance 25. Decoupling ("tuning out") of the screen grid voltage is effected by the condenser 26. The negative grid bias in produced in the well known manner by the cathode resistance 27 together with the parallel connected condenser 28. By means of the coupling condenser 31, the voltage of the beat frequency of the mixer portion of tube 29 is applied to the grid of the triode system of tube 29. The negative grid bias voltage of this grid is provided by the grid-leak resistance 32.

The degree of amplification of the triode system is made dependent on the frequency by using an inductance 33 as the plate resistance. If the circuit elements are suitably proportioned, an alternating anode voltage will be produced which is proportional to the beat frequency.

This alternating anode potential is applied to the grid of the electron tube 40 through the coupling condenser 34 and the potentiometer 35. This tube 40 is connected in as an amplifier tube in the usual manner. Its negative grid bias voltage is produced by the cathode resistance 38 together with the decoupling condenser 39. An amplified alternating potential will be produced at the plate resistance 41.

By means of the coupling condenser 42 the said potential is applied to the resistance 43 and rectified, for example, by means of a diode of the electron tube 47. A continuous voltage linear with respect to the beat frequency and which controls the control grid of tube 47 will thus be produced at the condenser 46.

The time constant of the rectifier circuit is mainly determined by the value of the resistance 45 and the condenser 46. These are so proportioned that even the most rapid changes in amplitude of the beat frequency produce an exactly corresponding continuous potential. It was described above that the degree of amplification of the apparatus should be adjusted prior to making actual measurements and in such fashion that the average cross section of the test material 54 shows a deflection of 100% at the instrument 10. This adjustment can be readily effected by adding a supplementary condenser 44 to condenser 46 by means of the switch 36. This increases the time constant of the rectifier circuit and the continuous potential at the control grid of tube 47 will then no longer be able to follow the rapid changes in the amplitude of the beat frequency, that is, it will adjust itself to an average value, which is practically the same as the average substance cross section value of the test material 54.

Anode current changes which can be read off at the indicating instrument 10 can be produced by changing the control grid bias voltage of tube 47. A recording ampere meter 11, connected in series with the indicating instrument 10, can be used for recording the measurement values.

It is preferable to insert a substitute resistance 48 in series with the indicating instrument 10 by means of switch 49 when the recording instrument is not being used. By taking this precaution, the operating conditions of the tube 47 will remain unchanged, regardless whether operations are being conducted with recording or without.

An embodiment of the measuring condenser 3 is given herewith, reference being directed to Figs. 3 and 4. In principle, an electrical field between two condenser plates 50 and 51 through which the test material 54 is drawn at uniform speed is utilized for measuring the substance cross section of the test material. If large and small test material cross sections were averaged and measured in one and the same condenser, the separation between the condenser plates 50 would have to be large enough to accommodate the largest cross section. Small cross sections of test material, would, in such a condenser, effect only a small change in capacity, which could not be satisfactorily amplified and indicated.

In order to obviate this drawback, it is preferable to use two or more measuring condensers, having different plate separations. Test materials of large average substance cross section could then be measured in measuring fields where the condenser plate separation is large and test materials of small average substance cross section could be measured in fields where the plate separation is smaller.

The various condensers could also be made interchangeable. However, interchangeability interposes certain difficulties as regards electrical stability of the circuit.

It is preferable to use a specially constituted measuring condenser having a plurality of measuring fields. The measuring condenser may, for that purpose, be geometrically so constituted as to have locally separate measuring fields suited for measurement purposes and in which the cross section size of the material will produce various changes in capacity.

In the embodiment shown in Fig. 3, the measuring condenser 3 is constituted in comb-like form. The condenser plates 50, 51 are so connected to the condenser terminals 52 and 52' as to produce a plurality of measuring fields with various changes of capacity per cross sectional unit of substance. The geometric constitution of the measuring condenser may be such that for certain substance cross sections, suitable measuring fields will aways be available and in which the capacity change will be equally great.

The thickness $t$ of the condenser plates 50, 51 may in practice be kept slightly below 1/20 inch so that even any irregularities that may occur only in a short length of yarn can be detected and indicated. The condenser plates 50, 51 are protected against external mechanical and electrical disturbances by means of an electrostatic shield 56.

In order to prevent foreign substances from entering the hollow space between the condenser plates 50, 51 and the electrostatic shield, a mass of electrical insulating material 55 may be provided in such fashion as to leave a free passage for drawing the test material 54 through. This insulating material should possess as stable a dielectric constant as possible and should not vary with the temperature.

In order to avoid measurement errors, no test materials of large average substance cross section must be measured in a measuring field having too small a plate separation $d$. As will be seen below, appreciable errors occur as soon as the condenser field becomes filled more than about 20% with test material. By means of mathematical calculations based on the physical laws governing condenser fields it can be shown that the change in capacity of the measuring condenser 3 is dependent on the substance cross section and on the dielectric constant $\epsilon'$ of the test material 54. Fig. 5 shows a measuring field of the measuring condenser 3. It is formed by the two plates 50, 51. The test material 54, consisting of numerous textile fibers, is in the electrical field 53. The capacity value of the condenser under consideration without any test material inserted therein is calculated by the well-known formula:

$$C_0 = \frac{\epsilon F}{4\pi d} \quad (1)$$

wherein:

$C_0$ denotes the capacity value of the empty condenser in cm.
$\epsilon$ the dielectric constants of the dielectric (in this case, air, with a constant of about 1).
$F$ the surface of the condenser plates in cm.²
$d$ the separation of the condenser plates 50, 51.

Since the dielectric of the condenser under consideration is constituted of air with a dielectric constant of 1, Formula 1 can be simplified as follows:

$$C_0 = \frac{F}{4\pi d} \quad (2)$$

The change in capacity $\Delta C$ produced by the test material 54 is dependent on the geometric position of the test material in the measurement field 53, that is, for the same substance cross section the looser and unshaped test material 54 shown in Fig. 5 produces the same change in capacity $\Delta C$ as the compact and shaped test material 54' shown in Fig. 6.

The condenser shown in Fig. 6 is a so-called layer condenser, the capacity value of which can be calculated by the following well-known formula:

$$C_0 = \frac{F}{4\pi} \frac{1}{\left(d - S + \frac{S}{\epsilon'}\right)} \quad (3)$$

wherein:

$C$ denotes the capacity value of the condenser with the test material 54' in place;
$S$ the thickness of the compact test material layer in cm.
$\epsilon'$ the dielectric constant of the test material 54'.

The capacity value $C$ of the condenser with test material in place is composed of the capacity value $C_0$ of the empty condenser and the variation produced by laying the test material 54' in the condenser field 53.

$$C = C_0 + \Delta C \quad (4)$$

From Formulas 2 and 3 it is possible to derive the factor for the relative capacity variation:

$$\frac{\Delta C}{C_0} = \frac{\frac{F}{4\pi}\frac{1}{d-S+\frac{S}{\epsilon'}}-\frac{F}{4\pi d}}{\frac{F}{4\pi d}} \quad (5)$$

This formula, when simplified, is:

$$\frac{\Delta C}{C_0} = \frac{\epsilon'-1}{1+\epsilon'\left(\frac{d}{S}-1\right)} \quad (6)$$

The quotient $$\frac{S}{d} = \lambda$$

may be defined as the so-called filling factor since it indicates what percentage of the measuring field is on the average filled with the compact test material.

Fig. 7 demonstrates Formula 6 graphically. From this it is apparent:

When the filling factor is small, the relative variation of the capacity value corresponds closely to the percentual filling factor of the measuring field 53. Furthermore, when the filling factor is small (up to about 20%) and when the dielectric constants are greater than $\epsilon'=4$, the relative variation of the capacity value is practically independent of the value of the dielectric constant. That is, under these conditions the relative capacity variation $$\frac{\Delta C}{C_0}$$

is, as desired, linearly dependent on the substance cross section of the test material. The independence of the dielectric constant $\epsilon'$ of the test material is of decisive significance in the present apparatus for measuring the uniformity of the substance cross section of textile materials since the dielectric constants of textile materials undergoing test often fluctuate in practice due to their variable water content. If the arrangement of the invention is supposed to give an indicated value proportional to the substance cross section, and if, furthermore, the variable water content has no disturbing influence on the measurement, the measuring condenser 3 is to be so proportioned that the filling factor does not exceed the approximate 20% value. Since the measuring device of the invention is provided with a number of measuring fields having various plate separations, it is always possible in the case of all substance cross sections occurring in practice, to select a measuring field which will fulfill the aforesaid conditions for obtaining a correct measurement.

What we claim and desire to secure by Letters Patent is:

1. In a high frequency oscillator measuring device for determining the substance cross section variations of textile materials, especially of yarn, roving and sliver, a measuring condenser, comprising two comb-shaped electrodes having teeth, the teeth of one electrode being offset and the electrodes being assembled so that the offset teeth of one electrode lie between the teeth of the other electrode, and so that between each tooth of one electrode and the adjacent tooth of the other electrode a measuring field is produced through which the material undergoing test is to be drawn, the width of the thus formed measuring fields being so chosen that the substance of the material undergoing test fills 2 to 20% of the measuring field utilized.

2. In a high frequency oscillator measuring device for determining the substance cross section variations of textile materials, such as yarn, roving and sliver, a measuring condenser, comprising two comb-shaped electrodes having teeth, the teeth of one electrode being offset and the electrodes being assembled so that the offset teeth of one electrode lie between the teeth of the other electrode and so that between each tooth of one electrode and each adjacent tooth of the other electrode a measuring field is produced through which the material undergoing test is to be drawn, the respective adjacent teeth of the two electrodes being spaced apart different distances to provide measuring fields of different sizes so as to be adapted for measuring different sizes of textile materials.

OSKAR GROB.
HANS LOCHER.

REFERENCES CITED

The following references are of record in the file of this patent:

UNITED STATES PATENTS

| Number | Name | Date |
|---|---|---|
| 1,878,109 | Clark | Sept. 20, 1932 |
| 1,895,118 | Allen | Jan. 24, 1933 |
| 2,222,221 | Burford | Nov. 19, 1940 |
| 2,285,152 | Firestone | June 2, 1942 |
| 2,373,846 | Olken | Apr. 17, 1945 |
| 2,387,496 | Cornelius | Oct. 23, 1945 |
| 2,422,742 | Adessy | June 24, 1947 |